United States Patent
Saegusa

(10) Patent No.: US 10,739,757 B2
(45) Date of Patent: Aug. 11, 2020

(54) SERVO SYSTEM AND SERVO SYSTEM CONTROL METHOD

(71) Applicant: Panasonic Intellectual Property Management Co., Ltd., Osaka (JP)

(72) Inventor: Fumitake Saegusa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/342,561

(22) PCT Filed: Oct. 25, 2017

(86) PCT No.: PCT/JP2017/038439
§ 371 (c)(1),
(2) Date: Apr. 17, 2019

(87) PCT Pub. No.: WO2018/084036
PCT Pub. Date: May 11, 2018

(65) Prior Publication Data
US 2020/0050176 A1 Feb. 13, 2020

(30) Foreign Application Priority Data
Nov. 1, 2016 (JP) ................................ 2016-213984

(51) Int. Cl.
*G05B 11/32* (2006.01)
*G05B 19/414* (2006.01)

(52) U.S. Cl.
CPC .. *G05B 19/414* (2013.01); *G05B 2219/34013* (2013.01)

(58) Field of Classification Search
CPC .................................................... G05B 19/414
(Continued)

(56) References Cited

U.S. PATENT DOCUMENTS

| 2003/0050725 A1 | 3/2003 | Dirnfeldner |
| 2003/0128007 A1 | 7/2003 | Fujisaki et al. |

(Continued)

FOREIGN PATENT DOCUMENTS

| JP | 2003-189654 | 7/2003 |
| JP | 2006-141088 A | 6/2006 |
| JP | 2008-176673 | 7/2008 |

OTHER PUBLICATIONS

International Search Report of PCT application No. PCT/JP2017/038439 dated Jan. 30, 2018.
(Continued)

*Primary Examiner* — Erick D Glass
(74) *Attorney, Agent, or Firm* — McDermott Will & Emery LLP

(57) ABSTRACT

This servo system is a servo system in which a host apparatus and a plurality of servo amplifiers transmit and receive a communication signal. Each of the servo amplifiers includes a servo computation unit configured to perform servo computation processing, a communication unit configured to transmit and receive the communication signal, a storage unit configured to save servo computation information in the servo computation processing as history data, and a trigger information processor configured to set, in advance, a save stop condition for stopping saving the history data, determine, for each servo computation period, whether the save stop condition is matched, and notify, when the save stop condition is matched, the communication unit of a determination result indicating detection of a trigger as a trigger detection flag.

11 Claims, 8 Drawing Sheets

(58) Field of Classification Search
USPC .......................................................... 318/562
See application file for complete search history.

(56) References Cited

U.S. PATENT DOCUMENTS

2010/0070668 A1* 3/2010 Maruyama .............. G06F 13/24
710/261
2019/0025783 A1* 1/2019 Tamashima ............ G05B 19/05

OTHER PUBLICATIONS

The Extended European Search Report dated Jan. 10, 2020 for the related European Patent Application No. 17868204.3.

* cited by examiner

SERVO SYSTEM AND SERVO SYSTEM CONTROL METHOD

CROSS-REFERENCE TO RELATED APPLICATIONS

This application is a U.S. national stage application of the PCT International Application No. PCT/JP2017/038439 filed on Oct. 25, 2017, which claims the benefit of foreign priority of Japanese patent application 2016-213984 filed on Nov. 1, 2016, the contents all of which are incorporated herein by reference.

TECHNICAL FIELD

The present invention relates to a servo system for controlling a plurality of servo amplifiers and a control method for the servo system and, more particularly, to an arrangement and method for saving and reading out history data in a servo computation in a servo system and a control method for the system, in which a plurality of servo shafts are simultaneously controlled to synchronously operate by serial communication such as industrial high-speed network communication.

BACKGROUND ART

Conventionally, some servo system has a function of saving information in a servo computation as history data in a memory serving as a storage unit and reading out history data to an external apparatus connected via a host apparatus.

For example, as shown in FIG. 7, in each servo amplifier 71 of conventional servo system 70 that controls a plurality of servo shafts, information in a servo computation in servo computation unit 74 is saved as history data Sv in memory 76. Saved history data Sv is read out to external apparatus 95 via host apparatus 85 and used for, for example, adjustment of servo control gain. Saved history data Sv is information corresponding to past m (where m is an integer) servo computation periods. Examples of history data Sv include a current motor position and a current motor speed.

Referring to FIG. 7, host apparatus 85 and the plurality of servo amplifiers 71 provided in servo system 70 are connected to each other via communication line 81. Assume that when servo computation units 74 of the plurality of servo amplifiers 71 execute computations, time axes of servo computation information are aligned. In this case, servo amplifier 71 can adjust the respective servo shafts more accurately.

For example, Patent Literature 1 discloses a technique configured to establish synchronization between a communication timing and servo computation processing.

In addition, as a technique for aligning the time axes of history data Sv based on the respective servo computations, there is disclosed an arrangement configured to cause host apparatus 85 to instruct servo amplifiers 71 to start saving or stop saving history data Sv in the arrangement shown in FIG. 7 described above (see, for example, Patent Literature 2).

That is, in conventional servo system 70 described above, host apparatus 85 needs to issue an instruction to stop saving history data Sv.

In recent years, open networks including EtherCAT (registered trademark) have been popularized. Along with the popularization of open networks, therefore, an increasing number of servo systems include combinations of different providers for host apparatuses and servo amplifiers. Accordingly, when a host apparatus has no function of issuing an instruction to stop saving servo computation information, the time axes of the respective pieces of servo computation information cannot be aligned.

CITATION LIST

Patent Literature

PTL 1: Unexamined Japanese Patent Publication No. 2003-189654
PTL 2: Unexamined Japanese Patent Publication No. 2008-176673

SUMMARY

A servo system according to the present invention is a servo system in which a host apparatus and a plurality of servo amplifiers transmit and receive communication signals to and from each other. Each servo amplifier in this servo system includes a servo computation unit configured to perform servo computation processing, a communication unit configured to transmit and receive a communication signal, a storage unit configured to save servo computation information in servo computation processing as history data, and a trigger information processor configured to set, in advance, a save stop condition for stopping saving history data, determine, for each servo computation period, whether the save stop condition is matched, and notify the communication unit of a determination result, as a trigger detection flag, indicating that a trigger is detected when the save stop condition is matched.

In addition, a control method for a servo system according to the present invention is a servo system in which a host apparatus and a plurality of servo amplifiers transmit and receive communication signals to and from each other. The control method for this servo system includes setting, in advance, a save stop condition for stopping saving history data in a storage unit configured to store servo computation information in servo computation processing as history data, determining, for each servo computation period, whether the save stop condition is matched, and setting, as a trigger detection flag, a determination result indicating that a trigger is detected when the save stop condition is matched.

The servo system and the control method for the servo system according to the present invention can align time axes of history data having undergone execution of servo computations by a plurality of servo amplifiers even in an arrangement using a host apparatus having no function of issuing an instruction to stop saving history data via a communication unit.

DESCRIPTION OF PREFERRED EMBODIMENTS

An exemplary embodiment of the present invention will be described with reference to the accompanying drawings. Note that the following exemplary embodiment is an example of implementing the present invention and does not limit the technical scope of the present invention.

Exemplary Embodiment

Figure 1:
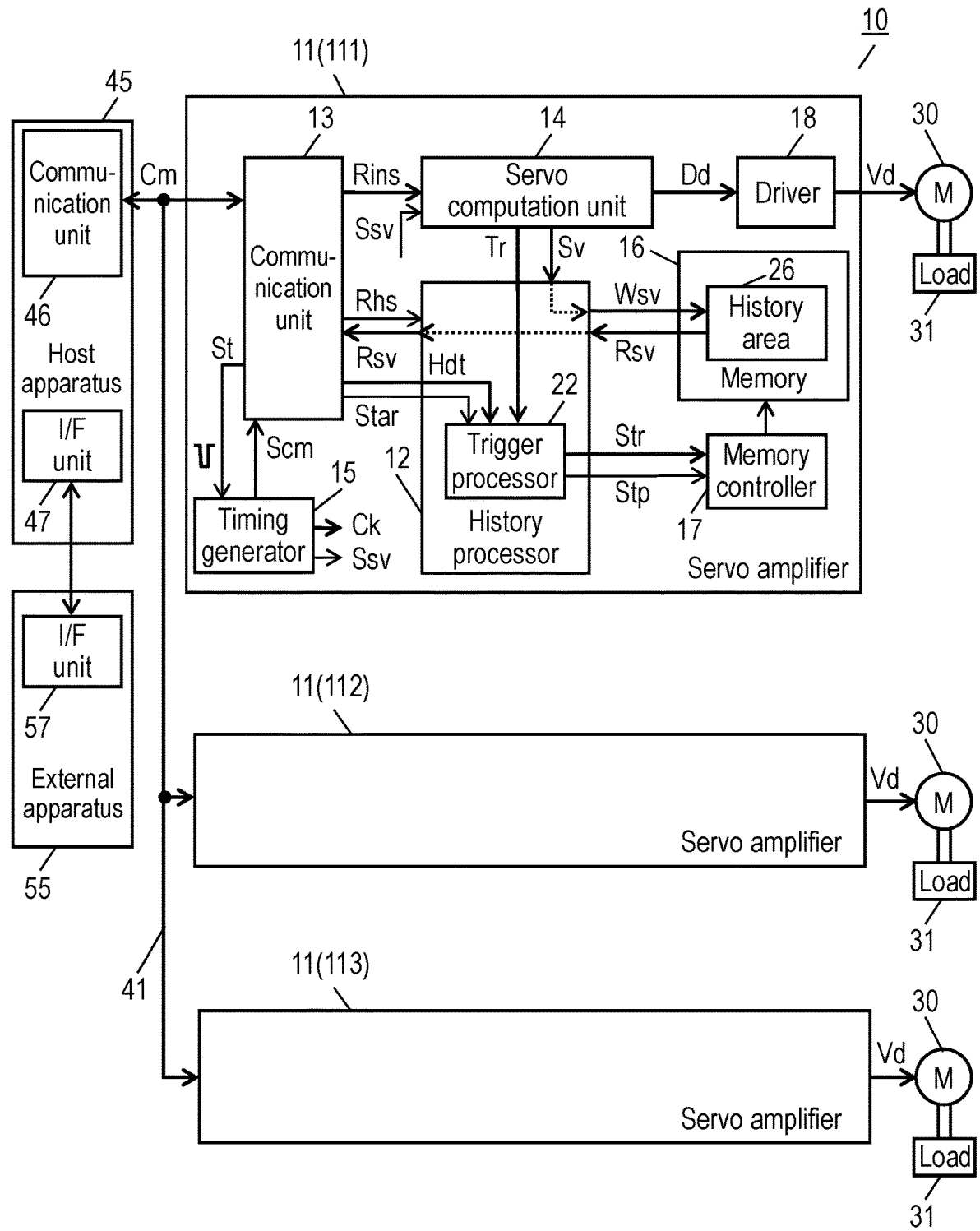
FIG. 1 is a block diagram for explaining main part of a servo system according to an exemplary embodiment of the present invention.

FIG. 1 is a block diagram showing an arrangement of servo system 10 according to an exemplary embodiment of the present invention.

As shown in FIG. 1, servo system 10 according to the exemplary embodiment of the present invention is configured such that host apparatus 45 and a plurality of servo amplifiers 11 are communicably connected to each other via communication line 41 based on a bidirectional one-to-one line network topology. FIG. 1 shows an example in which as the plurality of servo amplifiers 11, three servo amplifiers 11, each having the same internal arrangement, including first servo amplifier 111, second servo amplifier 112, and third servo amplifier 113 are connected to host apparatus 45 in the order named. Motor 30 for actuating load 31 is connected to an output of each servo amplifier 11. In this exemplary embodiment, with this arrangement, each servo amplifier 11 performs drive control of motor 30 in accordance with a command from host apparatus 45 so as to cause load 31 to execute a desired operation. Note that servo amplifiers 11 will be referred to as first, second, and third servo amplifiers 111, 112, and 113, respectively, when specifically referred to, and will be generically referred to as servo amplifier 11 hereinafter, as needed. A number of servo amplifiers 11 may differ as long as it is two or more.

In order to set control parameters and give operation commands to each servo amplifier 11, host apparatus 45 includes communication unit 46 for transmitting and receiving communication data, and each servo amplifier 11 includes similar communication unit 13. As shown in FIG. 1, communication unit 46 is connected to each communication unit 13 to bidirectionally transmit communication signal Cm including various information via communication line 41. As a specific communication means to be used for this arrangement, synchronous serial communication or the like is preferable. For example, EtherCAT (registered trademark) described above known as industrial high-speed network communication in recent years is suitably used.

Communication activities concerning, for example, parameter setting, are executed when the system is started up and an operation of the system is changed. Control parameters in this case include set values associated with control gains and filter characteristics. In addition to parameter setting, in order to cause motor 30 to perform a desired operation, host apparatus 45 transmits various information including operation commands as communication commands to each servo amplifier 11 and receives various information as communication responses from each servo amplifier 11.

In particular, parameter setting is irregularly performed at the time of initialization and the like, whereas operation commands need to be sequentially issued to instruct operations in the system. For this reason, in this exemplary embodiment, a reference period is set for updating and transmission of operation commands.

That is, in this exemplary embodiment, first, host apparatus 45 issues and updates an operation command for each operation command update period Tins as a period during which host apparatus 45 updates an operation command or the like. The exemplary embodiment exemplifies a case in which host apparatus 45 and the plurality of servo amplifiers 11 transmit and receive signals by synchronous serial communication to exchange data such as operation commands in communication period Tcm 1/L times (where L is an integer) operation command update period Tins. As described above, host apparatus 45 transmits a command signal including an operation command such as a position command or speed command for each communication period Tcm as a reference period. Each servo amplifier 11 controls an operation of motor 30 based on a received command signal. Each servo amplifier 11 transmits a return signal including operation information such as an operation state to host apparatus 45 for each communication period Tcm.

Although described in detail below, host apparatus 45 transmits communication timing signal St for each communication period Tcm. Each servo amplifier 11 then executes each process with reference to clock signal Ck phase-locked to communication timing signal St.

As shown in FIG. 1, host apparatus 45 may also be connected to interface unit 57 (to be referred to as an I/F unit as needed) of external apparatus 55 via external I/F unit 47 different from serial communication with the plurality of servo amplifiers 11 via communication line 41.

An outline of an arrangement of each servo amplifier 11 will be described next with reference to FIG. 1.

As shown in FIG. 1, each servo amplifier 11 includes communication unit 13, servo computation unit 14, timing generator 15, memory 16 as a storage unit, memory controller 17, driver 18, and history processor 12. History processor 12 includes trigger processor 22. Drive signal Vd output from driver 18 is supplied to motor 30. Load 31 is connected to motor 30.

In this arrangement, communication unit 13 exchanges information and signals with host apparatus 45 by using communication signals Cm. In order to perform drive control for an operation of motor 30 in accordance with a command from host apparatus 45, servo amplifier 11 includes servo computation unit 14 for controlling a position, speed, and torque of motor 30 and driver 18 for energizing and driving windings of motor 30. Servo computation unit 14 performs servo computation processing for each servo computation period Tsv to be described below, such as position control for controlling a position, speed control for controlling a speed, and torque processing of performing processing associated with a torque. Timing generator 15 generates clock signal Ck phase-locked to communication timing signal St and also generates various types of timing signals phase-locked to communication timing signal St by, for example, causing servo computation period Tsv to synchronize with a period 1/M times (where M is an integer) communication period Tcm. Driver 18 generates drive signal Vd based on drive data Dd calculated by servo computation processing performed by servo computation unit 14.

This exemplary embodiment is characterized in that servo amplifier 11 is configured to acquire a history of data used in servo computation processing by servo computation unit 14. That is, the exemplary embodiment further includes history processor 12, memory 16, and memory controller 17 so as to execute processing associated with history of data in servo computation unit 14. In this case, history processor 12 extracts history data Sv as part of various types of control data in servo computation unit 14 from the control data in response to an instruction to execute history processing issued by host apparatus 45. In addition, history processor 12 controls memory controller 17 to control reading, writing, and the like with respect to memory 16. This causes memory 16 to store history data Sv as servo computation information corresponding to past N (where N is an integer) servo computation periods Tsv. Servo computation information Sv is part of control data used in servo computation processing. An example of servo computation information Sv is information such as a current motor position and a current motor speed. For example, in response to a position command from host apparatus 45, history data Sv representing a current motor position sequentially following up is saved in memory 16.

As described above, host apparatus 45 transmits an operation command to each servo amplifier 11 via communication unit 46 configured to perform communication based on synchronous serial communication in predetermined communication period Tcm. Operation commands include a position command. Each servo amplifier 11 drives motor 30 based on the received operation command. Motor 30 transmits power to load 31. In the following description, servo amplifier 11 and motor 30 connected to servo amplifier 11 will also be referred to as servo shafts.

An arrangement of each component of each servo amplifier 11 will be described in more detail next.

In servo amplifier 11, first of all, as described above, communication unit 13 is connected to communication line 41, and receives various information including control parameters and operation commands, as communication signal Cm, from host apparatus 45. Communication unit 13 also transmits various pieces of information in servo amplifier 11 to host apparatus 45.

Communication unit 13 receives control parameters including a group of data such as various types of gains and filter constants from host apparatus 45, for example, at the time of initialization at startup of the system, and sets the parameters in servo computation unit 14. Upon completion of initialization, host apparatus 45 transmits information including an operation command as communication command Ccmd in communication signal Cm for each communication period Tcm, and communication unit 13 receives the information. Communication unit 13 analyzes received communication signal Cm and extracts communication command Ccmd sent to communication unit 13. In addition, communication unit 13 extracts, for example, command data Rins, history processing data Hdt described detail below, and save start command Star from extracted communication command Ccmd. For example, command data Rins is notified as a position or speed command to servo computation unit 14, as shown in FIG. 1. Servo computation unit 14 then executes operation control so as to follow up a command represented by command data Rins.

Figure 2:
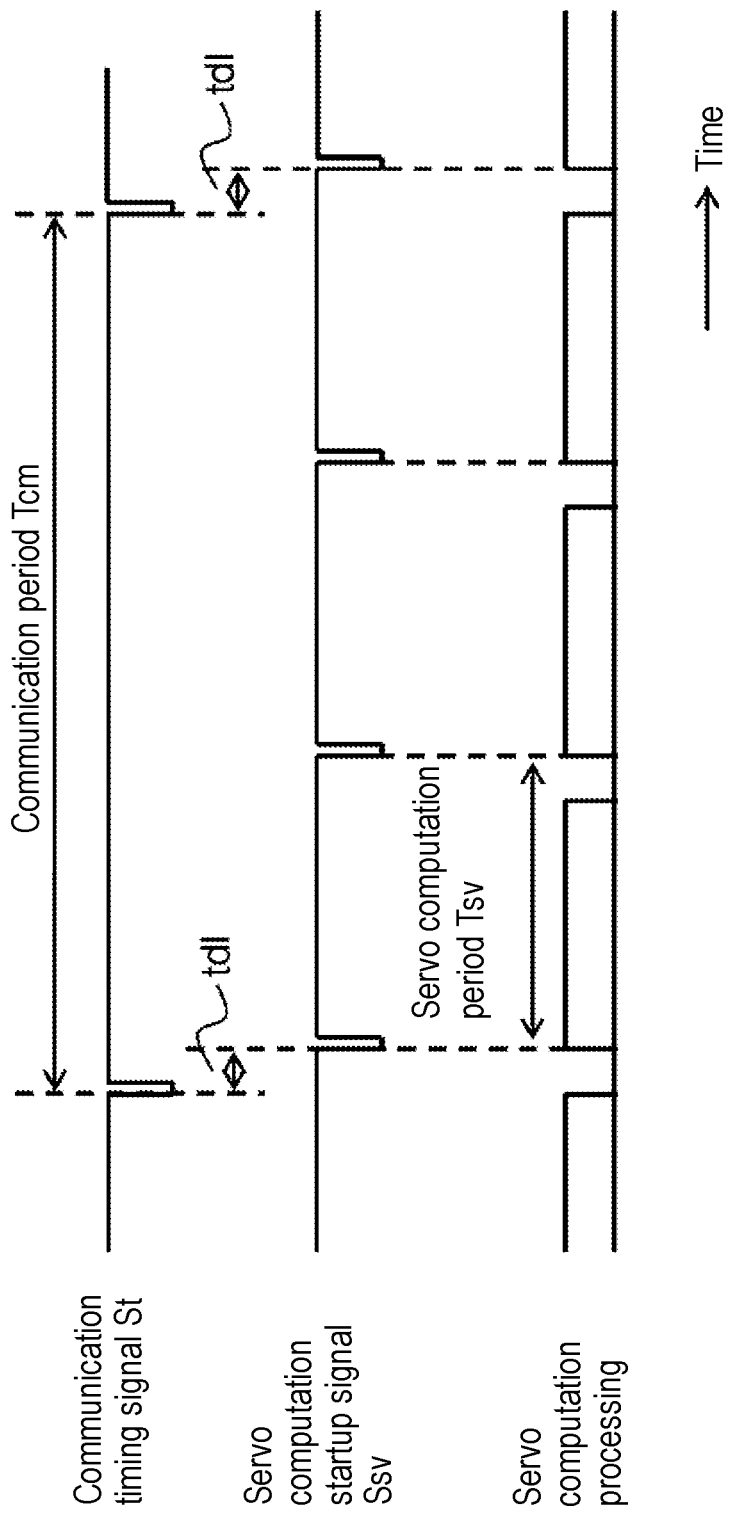
FIG. 2 is a timing chart showing an example of timings including a communication period and a servo computation period used in the servo system according to the exemplary embodiment of the present invention.
Figure 3:
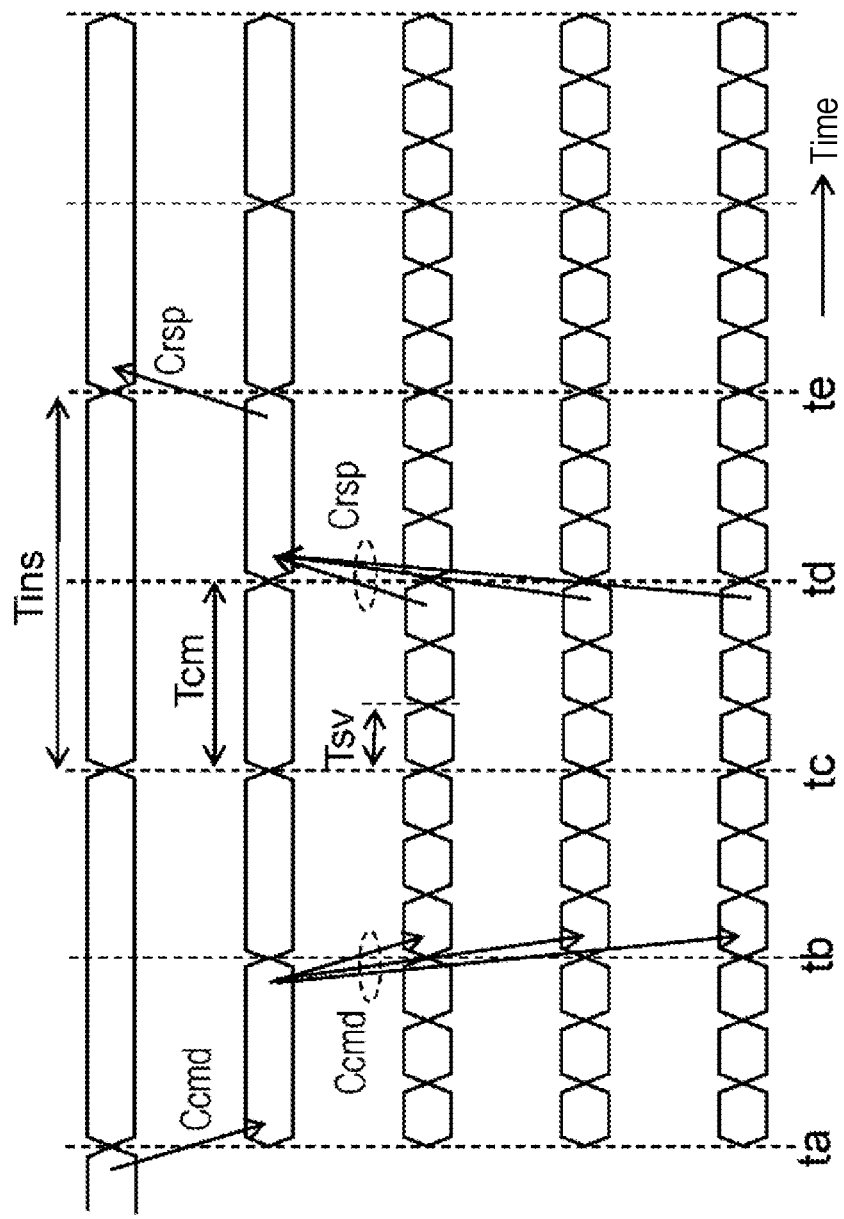
FIG. 3 is a timing chart showing an example of timings of data transmitted and received between a host apparatus and servo amplifiers provided in the servo system according to the exemplary embodiment of the present invention.

FIG. 2 is a timing chart showing an example of timings including communication period Tcm and servo computation period Tsv used in servo system 10 according to the exemplary embodiment of the present invention. FIG. 3 is a timing chart showing an example of timings of data transmitted and received between host apparatus 45 and first, second, and third servo amplifiers 111, 112, and 113.

A relationship between timings including communication period Tcm and servo computation period Tsv will be described by presenting a specific example with reference to FIGS. 2 and 3.

In this exemplary embodiment, L of ratio 1/L between operation command update period Tins and communication period Tcm described above is set as L=2, and M of ratio 1/M between communication period Tcm and servo computation period Tsv is set as M=3.

With this setting, in this exemplary embodiment, if one period during which host apparatus 45 updates a command, that is, one command update period Tins, is set to 1.0 ms, one communication period Tcm of servo amplifier 11 is ½ of command update period Tins, and hence is 0.5 ms. In addition, if one communication period Tcm is 0.5 ms, one servo computation period Tsv is ⅓ of communication period Tcm as shown in FIG. 2, and hence is 0.166 ms. Communication timing signal St is transmitted while being superimposed on communication signal Cm from host apparatus 45 every time one communication period Tcm elapses and an operation command is transmitted. In addition, servo computation startup signal Ssv is generated every time one servo computation period Tsv elapses. When servo computation startup signal Ssv is generated, each servo amplifier 11 performs servo computation processing as shown in FIGS. 2 and 3. Accordingly, in the exemplary embodiment, servo computation processing executed three times during one communication period Tcm.

In order to generate servo computation startup signal Ssv or the like synchronized with communication timing signal St, communication unit 13 detects communication timing signal St and transfers the signal to timing generator 15. In this case, operation commands and the like are signals used as data, whereas communication timing signal St is a pulse signal indicating a periodic timing. In this exemplary embodiment, timing generator 15 generates clock signal Ck synchronized with a period of communication timing signal St by using communication timing signal St as a synchronization signal. Timing generator 15 further includes a frequency dividing counter for frequency-dividing clock signal Ck and a phase comparator and constitutes a so-called phase locked loop (PLL) circuit by using them. With this arrangement, based on the principle of PLL, clock signal Ck is phase-locked to communication timing signal St and is synchronized with communication timing signal St. As is well known, clock signal Ck is used in digital processing inside servo amplifier 11. Servo computation startup signal Ssv as a pulse signal like that shown in FIG. 2 and a signal (not shown) for generating a pulse width modulation (PWM) carrier signal used by the driver 18 are generated by frequency-dividing clock signal Ck by a predetermined ratio using a frequency-dividing counter or the like. Note that FIG. 2 shows an example in which timing generator 15 generates servo computation startup signal Ssv so as to stabilize delay time tdl of servo computation startup signal Ssv with respect to communication timing signal St. In the first exemplary embodiment, delay time tdl is 10 μs.

When a clock signal for servo amplifier 11 is a free-running signal, a clock error or the like sometimes occurs due to manufacture variations of hardware. When a clock error or the like occurs, communication period Tcm does not sometimes become a perfect integer multiple of servo computation period Tsv. In contrast to this, in this exemplary embodiment, timing generator 15 is configured to generate clock signal Ck synchronized with a period of communication timing signal St. Accordingly, servo computation processes executed by the respective servo shafts coincide in startup timing.

Timing generator 15 then supplies servo computation startup signal Ssv synchronized with communication timing signal St to servo computation unit 14. As described above, servo computation unit 14 executes servo computation processing in synchronism with a timing of servo computation startup signal Ssv. Accordingly, servo computation processes executed by the respective servo shafts coincide in timing.

Servo amplifier 11 is further provided with servo computation unit 14 and driver 18 to control an operation of motor 30. In this case, motor 30 is, for example, a UVW three-phase brushless motor. That is, motor 30 is configured to include a stator having windings corresponding to the respective phases and a rotor holding a permanent magnet. Adding drive signals Vd with different phases to the respective windings of the stator will energize the windings. As a result, a current flows in each winding to rotate the rotor. Note that motor 30 may be a linear motor that directly performs linear position control of load 31.

Servo computation unit 14 controls a position and a speed of motor 30 so as to perform drive control of motor 30. Driver 18 energizes and drives the windings of motor 30.

First of all, host apparatus 45 generates command data Rins as an operation command for each command update period Tins to cause servo amplifier 11 to control motor 30 in this manner. Host apparatus 45 notifies servo amplifier 11 of command data Rins including communication signal Cm for each communication period Tcm. Communication unit 13 extracts command data Rins from received communication signal Cm, and supplies command data Rins to servo computation unit 14. Command data Rins is data representing a command position and a command speed.

In this case, when, for example, host apparatus 45 supplies a position command instructing a rotor position, servo computation unit 14 performs the following operation so as to control a position of motor 30. That is, servo computation unit 14 controls a rotating operation to cause an actual rotational position of the rotor of motor 30 to follow up a position command represented by command data Rins from host apparatus 45 by feedback control using detected position information from a position detector or the like.

In order to perform such feedback control, servo computation unit 14 executes the following computation processing. That is, first of all, for position control, servo computation unit 14 calculates a position deviation as a difference between a position command and detected position information from a position detector (not shown). In addition, for position control, servo computation unit 14 calculates a speed command by performing computation such as multiplying the position deviation by a position gain. Servo computation unit 14 also calculates a rotational speed of motor 30 by, for example, differential computation with respect to notified position detection information. In addition, servo computation unit 14 calculates a speed deviation as a difference between the calculated rotational speed and the speed command. Furthermore, servo computation unit 14 calculates a torque command corresponding to an amount of drive torque that tries to actuate motor 30 by performing proportion computation and integration computation with respect to the speed deviation, and supplies the calculated torque command as drive data Dd to driver 18.

Driver 18 generates drive voltage Vd based on drive data Dd supplied from servo computation unit 14. More specifically, driver 18 includes a pulse width modulation (PWM) circuit and an inverter formed from a switch element. Driver 18 generates pulse signals pulse-width-modulated by the PWM circuit in accordance with drive data Dd, and generates drive signal Vd by ON/OFF-controlling the switch element of the inverter based on the pulse signals. In this manner, driver 18 drives motor 30 by applying generated drive signal Vd to the winding corresponding to each phase.

Servo amplifier 11 in this exemplary embodiment includes history processor 12, memory 16, and memory controller 17 to sequentially extract and save data in processing by servo computation unit 14, as described above.

In order to execute such history processing, first of all, communication signal Cm from host apparatus 45 includes communication command Ccmd associated with history processing, and communication unit 13 extracts communication command Ccmd associated with history processing and supplies the command to history processor 12. Communication commands Ccmd associated with history processing include history processing data Hdt, save start command Star, and readout command Rhs.

In this case, history processing data Hdt includes save type information Isv of target data to be saved as a history, trigger type information Itr of target data to be used as a trigger to stop saving, and trigger level value Ith serving as a discrimination value for a trigger. Save type information Isv is information for designating, for example, a position deviation, a speed deviation, or a rotational speed as processing in servo computation unit 14. Trigger type information Itr is also information for designating, for example, a position deviation, a speed deviation, or a rotational speed like command data Rins or save type information Isv as processing in servo computation unit 14. Save start command Star is a command for instructing to start saving a history in memory 16. Readout command Rhs is a command for instructing to start reading out data saved as a history in memory 16.

History processor 12 executes processing associated with history saving in accordance with history processing data Hdt and save start command Star from communication unit 13. History processor 12 refers to save start command Star. If save start command Star indicates a start of saving, history processor 12 starts processing associated with history saving.

History processor 12 includes trigger processor 22. Trigger processor 22 is provided to stop processing associated with history saving. Trigger type information Itr, trigger level value Ith, and the like included in history processing data Hdt are supplied to trigger processor 22. Trigger processor 22 acquires type data represented by trigger type information Itr as trigger data Tr from servo computation unit 14. In addition, trigger processor 22 compares trigger data Tr with trigger level value Ith. When trigger data Tr exceeds trigger level value Ith, trigger processor 22 stops processing associated with history saving.

Trigger processor 22 outputs save start signal Str and save stop signal Stp to memory controller 17 to start and stop processing associated with history saving. That is, trigger processor 22 outputs save start signal Str based on save start command Star. In addition, trigger processor 22 outputs save stop signal Stp based on a comparison between trigger data Tr and trigger level value Ith described above. Memory controller 17 permits writing in memory 16 at a save start timing of save start signal Str, and inhibits writing in memory 16 at a save stop timing of save stop signal Stp.

Concurrently with processing by trigger processor 22, history processor 12 acquires type data represented by save type information Isv as history data Sv from servo computation unit 14, and supplies the acquired data as write history data Wsv to memory 16.

When history processor 12 executes the above operation, history data Sv from a start of saving to a stop of saving is stored in history area 26 as a computation history save area of memory 16 for each servo computation period Tsv.

More specifically, for example, history processor 12 operates as follows. Assume that save type information Itr for designating save target data is "position deviation", trigger type information Isv for designating trigger target data is "rotational speed", and trigger level value Ith is "1000 rpm". In this case, history processor 12 executes the following processing. That is, history processor 12 acquires position deviation data in servo computation unit 14 as history data Sv. History processor 12 then records position deviation data acquired as history data Sv as a history in memory 16 for each servo computation period Tsv until a rotational speed as trigger data Tr reaches 1000 rpm as trigger level value Ith.

In particular, although described in detail later, servo amplifiers 11 are configured concerning save stopping operations in this exemplary embodiment such that servo amplifier 11 that has detected a trigger first operates differently from other servo amplifiers 11. According to the exemplary embodiment, adopting such an arrangement will finally match timings of acquiring history data Sv of servo amplifiers 11 each other.

When a readout instruction is issued based on readout command Rhs, history processor 12 reads out a group of history data Sv saved in memory 16 as readout history data Rsv and transfers the data to communication unit 13. Communication unit 13 transmits the data as communication response Crsp to host apparatus 45.

A detailed operation of the servo system according to this exemplary embodiment will be described next, with a focus on a flow of data between host apparatus 45 and each servo amplifier 11.

As described above, communication signal Cm including communication command Ccmd and communication response Crsp is transmitted between host apparatus 45 and each servo amplifier 11. Communication command Ccmd is data transmitted from host apparatus 45 to each servo amplifier 11. Communication response Crsp is data returned from each servo amplifier 11 to host apparatus 45. Communication command Ccmd is transmitted from host apparatus 45 and reach each servo amplifier 11 via communication line 41. In addition, communication response Crsp is returned from servo amplifier 11 and reaches host apparatus 45 via communication line 41.

Communication command Ccmd is transmitted from host apparatus 45 to each servo amplifier 11 at time ta, as shown in FIG. 3. Communication command Ccmd includes an individual instruction corresponding to each of servo amplifiers 111, 112, and 113. The communication unit of each servo amplifier 11 checks acquired communication command Ccmd, refers first to a shaft address for identifying each servo amplifier 11, and extracts communication command Ccmd as an instruction issued to servo amplifier 11 itself.

First of all, at time ta, communication command Ccmd issued to each servo amplifier 11 is set with respect to communication unit 46 in host apparatus 45. In this case, time ta is a timing when command update period Tins and communication period Tcm of communication unit 46 are updated.

At time tb, communication unit 46 simultaneously transmits communication commands Ccmd to communication unit 13 of each of servo amplifiers 111, 112, and 113. In this case, time tb is a timing when communication period Tcm between communication unit 46 and communication unit 13 and servo computation period Tsv of each servo amplifier 11 are updated.

Subsequently, each servo amplifier 11 that has received communication command Ccmd identifies communication command Ccmd issued to servo amplifier 11 itself with the shaft address. Each servo amplifier 11 executes servo computation processing based on each identified communication command Ccmd.

Communication response Crsp is returned from each servo amplifier 11 to host apparatus 45 at time td, as shown in FIG. 3.

First of all, at time td, communication response Crsp is set as a response to host apparatus 45 with respect to communication unit 13 in each servo amplifier 11. In this case, time td is a timing when servo computation period Tsv of each servo amplifier 11 and communication period Tcm of communication unit 13 are updated.

At time te, communication unit 13 transmits communication response Crsp to communication unit 46 of host apparatus 45. Communication response Crsp is information obtained by combining communication responses in respective servo amplifiers 11. In this case, time te is a timing when communication period Tcm between communication unit 13 and communication unit 46 and command update period Tins are updated.

The respective communication responses are sometimes set with respect to communication units 13 in respective servo amplifiers 11 at time tc. In this case, at time td, each communication unit 13 is ready to transmit communication response Crsp to communication unit 46 of host apparatus 45. However, time td is not a timing when communication period Tcm of communication unit 46 and command update period Tins are updated. Accordingly, at time td, each communication unit 13 does not transmit communication response Crsp to host apparatus 45. Subsequently, each communication unit 13 transmits communication response Crsp to host apparatus 45 at time te as a timing when communication period Tcm of communication unit 46 and command update period Tins are updated.

Following the above procedure, host apparatus 45 and each servo amplifier 11 transmit and receive data to and from each other.

When the servo system is formed from a ring network topology, communication commands are transmitted to the respective servo amplifiers in an order in which the servo amplifiers are connected to the host apparatus. Likewise, communication responses are transmitted to the host apparatus in an order in which the host apparatus is connected to the respective servo amplifiers. That is, the servo amplifier located on the last stage is the one that can acquire communication responses transmitted from all the servo amplifiers.

Alternatively, when the servo system is formed from a line network topology, each servo amplifier acquires communication responses transmitted from the remaining servo amplifiers at a timing when a communication period is updated, regardless of an order of connection. For example, in this exemplary embodiment, a timing when communication period Tcm is updated is time ta, time tb, time tc, time td, or time to shown in FIG. 3.

Servo system 10 according to this exemplary embodiment can obtain conspicuous function effects by using a line network topology. Accordingly, the following description will be made on the assumption that servo system 10 uses a line network topology.

Figure 4:
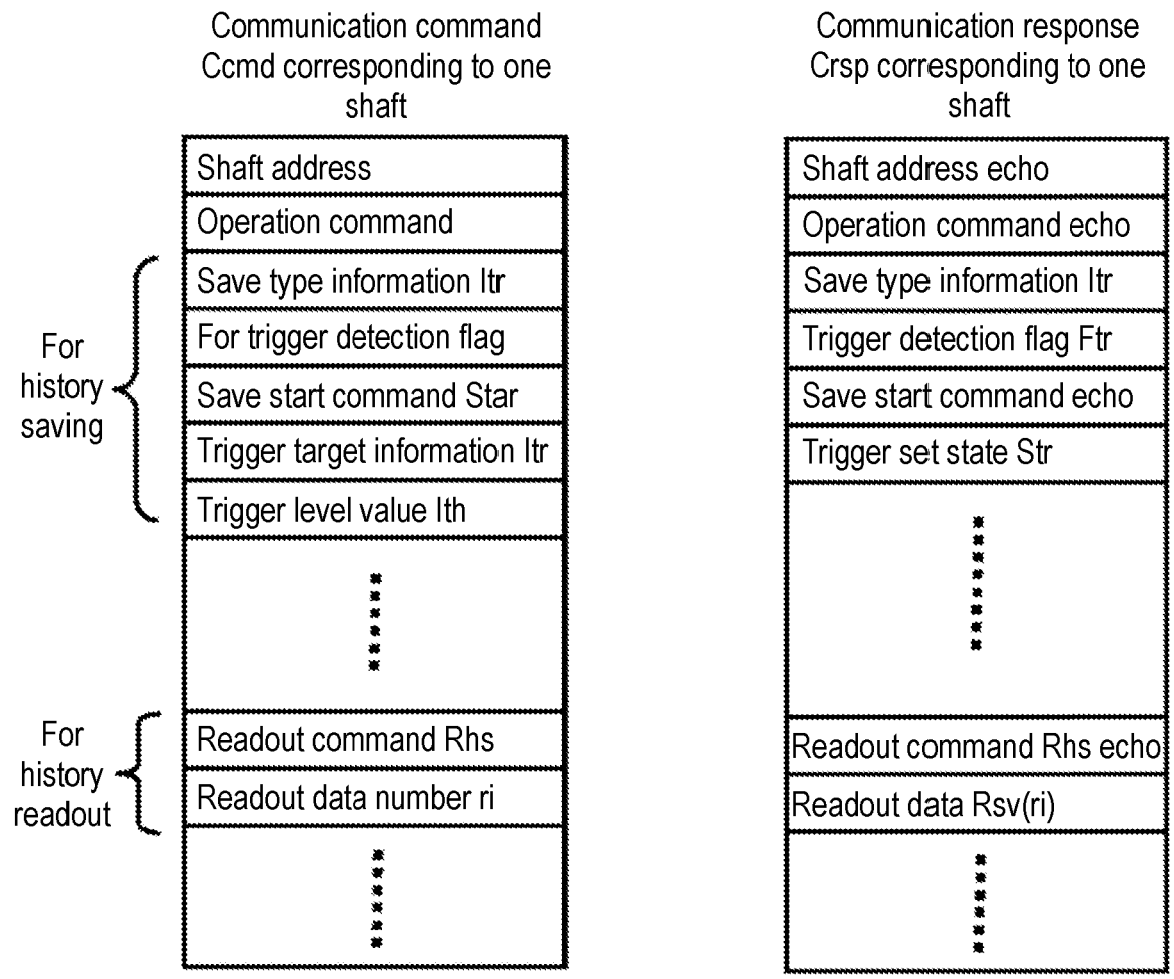
FIG. 4 is a view showing data configurations of a communication command and a communication response used in the servo system according to the exemplary embodiment of the present invention.

FIG. 4 shows data configurations of communication command Ccmd and communication response Crsp used in the servo system according to the exemplary embodiment of the present invention.

Configurations of communication command Ccmd and communication response Crsp will be described with reference to FIG. 4, together with processing of saving history data Sv as servo computation information in memory 16.

Host apparatus 45 transmits communication command Ccmd focused on one shaft, that is a command for one servo shaft like that shown in FIG. 4, to servo amplifier 11. Servo amplifier 11 transmits communication response Crsp to host apparatus 45.

As shown in FIG. 4, communication command Ccmd includes data and commands associated with history saving and history readout in history processor 12. Data for history saving include the following data like those described above. That is, the data include save type information Itr for specifying a target to be saved in memory 16, save start command Star for instructing to start saving in memory 16, trigger target information Itr for specifying a target to be used for trigger processing, and trigger level value Ith indicating a level of a trigger used for trigger processing.

Data for history readout include readout command Rhs for instructing readout and readout data number ri for designating data to be read out from memory 16. In this case, according to this exemplary embodiment, readout data number ri is a number indicating a sequence number in a descending order from latest saved data. That is, in the exemplary embodiment, readout data number ri of 1 designates latest saved data, and readout data number ri of 2 designates data saved in memory 16 immediately before the latest saved data. Employing such setting allows host apparatus 45 to read out readout history data Rsv in chronological order from latest readout history data Rsv without designating any address in memory 16. In addition, host apparatus 45 can read out data starting from latest readout history data Rsv and hence can read out latest readout history data Rsv corresponding to the same time point from servo amplifiers 111, 112, and 113, thereby matching time axes of a group of history data Sv saved in memories 16 of servo amplifiers 11.

Communication unit 13 of each servo amplifier 11 transmits readout history data Rsv read out from memory 16 in this manner as readout data Rsv(ri) to host apparatus 45 as indicated by communication response Crsp in FIG. 4.

As described above, history data Sv that is servo computation information specified by save type information Itr is saved in memory 16. History data Sv is part of control data used for servo computation processing. A content of history data Sv, such as a current motor position or current motor speed, is determined by save type information Itr in advanced. Servo computation unit 14 executes servo computation processing.

Communication command Ccmd transmitted from host apparatus 45 includes save start command Star together with save type information Itr.

In order to save history data Sv in memory 16, host apparatus 45 transmits save start command Star to each servo amplifier 11 in same communication period Tcm.

Note that external apparatus 55 may transmit save start command Star to each servo amplifier 11 via I/F unit 47 of host apparatus 45.

One communication command Ccmd includes an operation command, trigger target information Itr, and trigger level value Ith in addition to save start command Star. Communication response Crsp corresponding to one shaft and returned in response to communication command Ccmd includes a shaft address echo, an operation command echo, a trigger detection flag, a save start command echo, a trigger setting state Str, and a readout command echo, in addition to save type information Itr. As history data Sv designated by save type information Itr, information calculated by latest servo computation processing is used.

Trigger set state Str is binary information. When, for example, trigger target information Itr and trigger level Ith are set in servo amplifier 11, trigger set state Str is set to "1" indicating that trigger processing is set. Otherwise, that is, when trigger target information Itr and trigger level Ith are not set in servo amplifier 11, trigger set state Str is set to "0" indicating that trigger processing is not set.

Checking trigger set state Str included in communication response Crsp allows host apparatus 45 or external apparatus 55 to determine whether trigger target information Itr and trigger level Ith are properly set in each servo amplifier 11.

When history processor 12 receives save start command Star, servo amplifier 11 saves history data Sv used in servo computation processing executed at a timing after the reception in history area 26[m] (where m is an integer) allocated in memory 16.

Note that "m" of history area 26[m] corresponds to an address in memory 16, and first data is saved in history area 26[1]. Subsequently, sequentially computed results are sequentially saved in history area 26[2], history area 26[3], ... in the order named. That is, mth data is saved in history area 26[m].

Eventually, an area in which history data Sv is saved in memory 16 reaches "m", that is, an upper limit count. In this case, (m+1)th history data Sv is overwritten in history area 26[1]. Subsequently, (m+2)th history data Sv are sequentially overwritten in history area 26[2], history area 26[3], ... in the order named. In this manner, history areas 26[m] according to this exemplary embodiment constitute a so-called ring buffer memory.

An operation of trigger processor 22 will be described next.

Trigger processor 22 sets trigger conditions based on trigger target information Itr and trigger level value Ith from communication command Ccmd, and instructs memory 16 to stop saving history data Sv based on a comparison between trigger data Tr designated by trigger target information Itr and trigger level value Ith.

Figure 5:
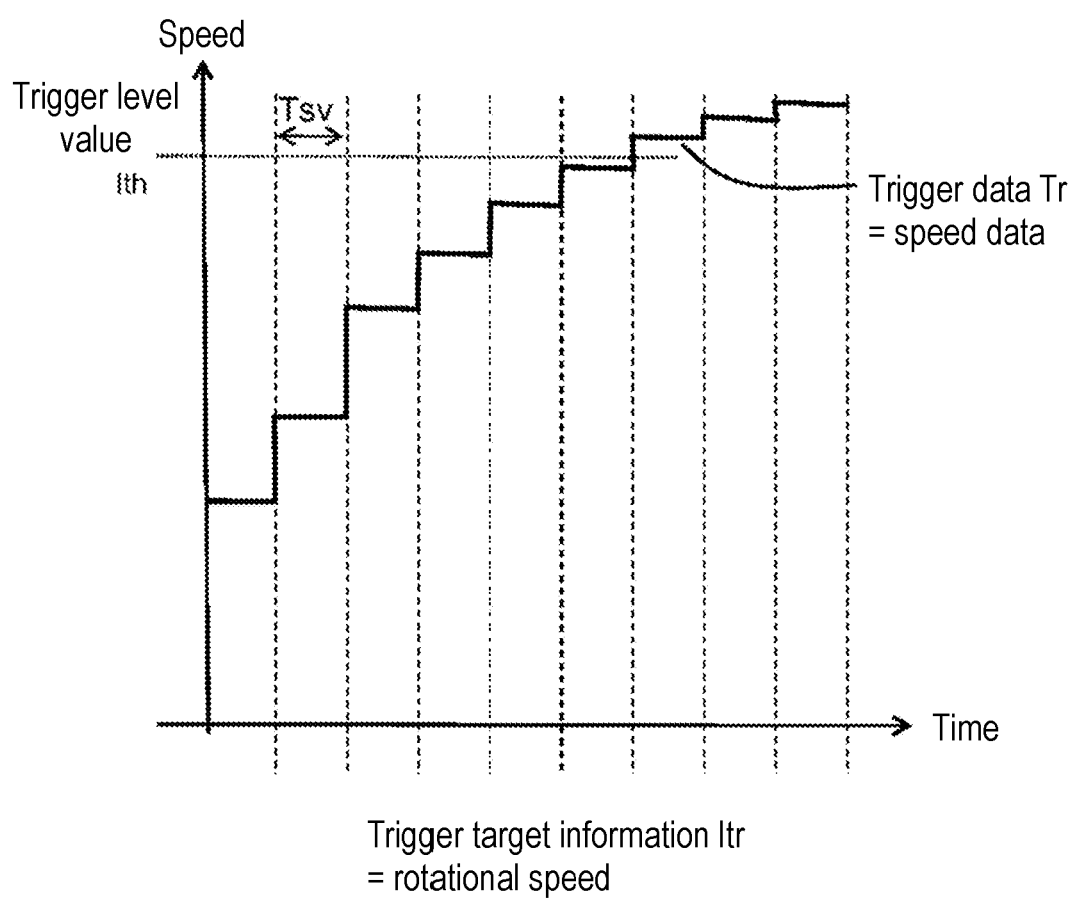
FIG. 5 is a graph showing an example of trigger condition setting and trigger detection.

FIG. 5 is a graph showing an example of trigger condition setting and trigger detection. FIG. 5 shows an example in which "rotational speed" is set as trigger target information Itr, and rotational speed data corresponding to "rotational speed" is extracted as trigger data Tr from servo computation unit 14. As shown in FIG. 5, trigger processor 22 determines, for each servo computation period Tsv, whether trigger data Tr has exceeded trigger level value Ith. When trigger conditions are set based on trigger target information Itr and trigger level value Ith described above, as shown in FIG. 5, it is determined, for each servo computation period Tsv, whether, for example, trigger data Tr such as a current motor speed is more than or equal to trigger level value Ith.

FIG. 5 shows a case in which a value of trigger data Tr increases for each servo computation period Tsv. When trigger data Tr becomes more than or equal to trigger level value Ith, trigger processor 22 sets binary information "1" as a determination result indicating that a trigger is detected in trigger detection flag Ftr included in communication response Crsp.

A save stop operation concerning history data Sv will be described next with reference to FIG. 6. Assume that in the following description, when trigger data Tr becomes more than or equal to trigger level value Ith, a trigger is detected.

Servo amplifier 11 that has detected a trigger first differs in save stop operation concerning history data Sv from other servo amplifiers 11. Accordingly, an operation of servo amplifier 11 that has detected a trigger first will be described first. Note that the former is defined as operation 1 of stopping saving, and the latter is defined as operation 2 of stopping saving. FIG. 6 shows a case in which first servo amplifier 111 has detected a trigger first, and second servo amplifier 112 and third servo amplifier 113 are other servo amplifiers 11.

Operation 1 of stopping saving will be described first.

Figure 6:
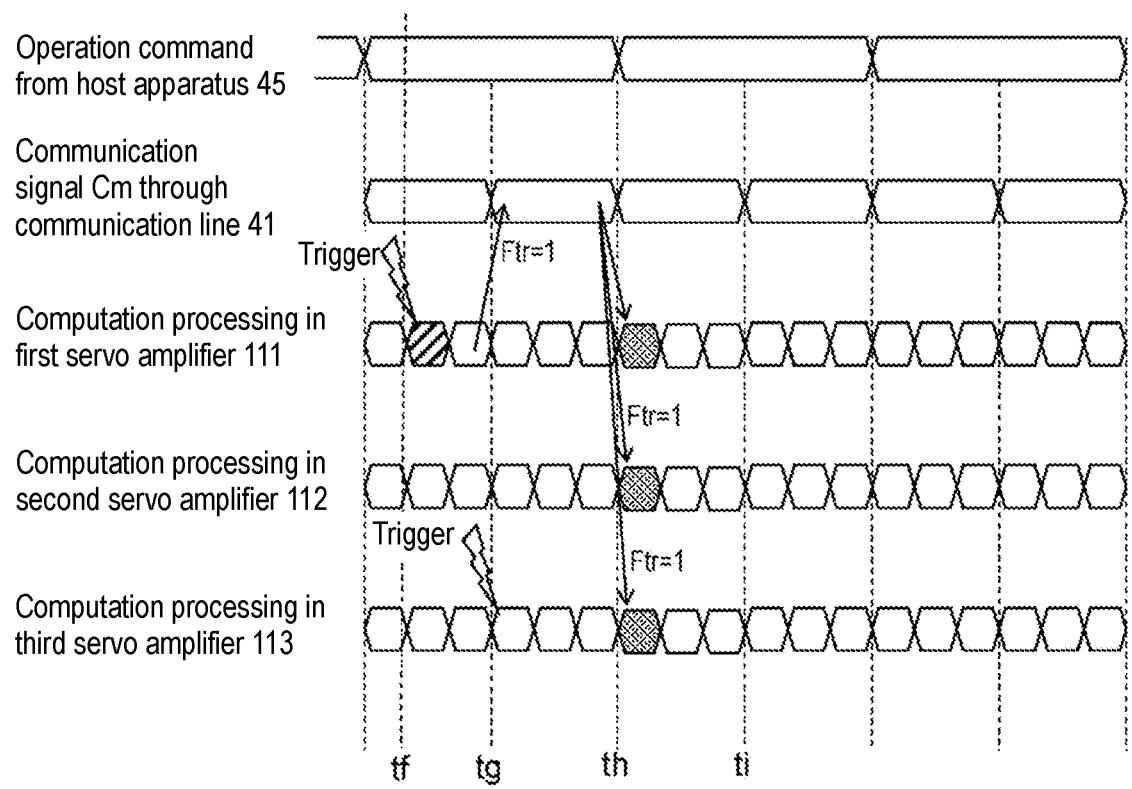
FIG. 6 is a timing chart associated with a save stop timing of servo computation information used in the servo system according to the exemplary embodiment of the present invention.

When trigger processor 22 of first servo amplifier 111 detects a trigger at time tf shown in FIG. 6, trigger processor 22 keeps calculating a hold count until a timing of instructing to stop saving history data Sv in memory 16. That is, servo amplifier 11 that has detected a trigger first stops saving history data Sv after saving the data by a hold count described next instead of immediately stopping saving history data Sv. This hold count is obtained by the following equation, assuming that information indicating a specific sequence number of current servo computation period Tsv in communication period Tcm is defined as a trigger detection period number.

hold count=(2× communication period/servo computation period−trigger detection period number+1), where digits after the decimal point are dropped.

In an example in FIG. 6, a hold count is calculated as follows.

hold count=2×0.5/0.166−2+1=5 (where digits after the decimal point are dropped)

The calculated hold count is decremented by "1" for each servo computation period Tsv after time tf when a trigger is detected. Subsequently, in servo computation period Tsv at time th when the hold count becomes "0", trigger processor 22 of servo amplifier 11 that has detected a trigger instructs memory 16 to stop saving history data Sv, thereby stopping saving history data Sv.

Operation 2 of stopping saving will be described next.

An operation of trigger processor 22 in each of second and third servo amplifiers 112 and 113 other than the first servo amplifier 111 that has detected a trigger first will be described.

Trigger detection flag Ftr updated by trigger processor 22 of first servo amplifier 111 at time tf in FIG. 6 is transmitted as communication response Crsp at time tg to communication unit 13. Communication response Crsp is transmitted as communication response Crsp to each of second and third servo amplifiers 112 and 113 at time th. In this case, time th is a timing when communication period Tcm of communication unit 13 and servo computation period Tsv of each servo amplifier 11 are updated. Trigger processor 22 of each of second and third servo amplifiers 112 and 113 determines, based on trigger detection flag Ftr included in communication response Crsp transmitted via first servo amplifier 111, whether another servo amplifier 11 has detected a trigger. Upon determining that another servo amplifier 11 has detected a trigger, trigger processor 22 instructs memory 16 of the self shaft to stop saving history data Sv, and then the saving history data Sv is stopped.

Assume that operation 2 of stopping saving is assigned higher priority than operation 1 of stopping saving in terms of control. This is because, when, for example, third servo amplifier 113 detects a trigger at time tg, third servo amplifier 113 actually stops saving at a timing of time ti according to operation 1 of stopping saving. In this case, time tg corresponds to an interval in which first servo amplifier 111 detects a trigger at time tf and the corresponding information is not transmitted to other servo shafts. In contrast to this, when operation 2 of stopping saving is assigned higher priority, third servo amplifier 113 can instruct memory 16 of the self shaft to stop saving history data Sv based on trigger detection flag Ftr transmitted at a timing of time th, and then saving of history data Sv is stopped.

The above operation of trigger processor 22 matches a timing of stopping saving history data Sv in each of the first, second, and third servo amplifiers 111, 112, and 113 with time th. This provides an effect of matching time axes of respective history data Sv.

Readout of information saved in memory 16 of servo amplifier 11 will be described next with reference to FIGS. 1 and 4.

Host apparatus 45 issues a readout instruction to each servo amplifier 11 via communication unit 46 to read out history data Sv saved in memory 16.

In practice, host apparatus 45 transmits readout command Rhs and readout data number ri for designating history data Sv as a readout target.

Note that readout command Rhs and readout data number ri may be transmitted from external apparatus 55 via host apparatus 45 by using I/F unit 57.

Upon receiving readout command Rhs and readout data number ri, servo amplifier 11 reads out designated history data Sv from designated history area 26[m] in accordance with a content designated by readout data number ri. Subsequently, servo amplifier 11 returns history data Sv as readout data Rsv(ri) to host apparatus 45 via communication unit 13.

A method of designating history area 26[m] will be described by presenting an example.

Assume that readout data number ri of 1 corresponds to latest history data Sv. In this case, servo amplifier 11 returns data in history area 26[i] in which last data is saved.

Assuming that readout data number ri of 2 corresponds to data immediately before a latest state corresponding to readout data number ri of 2, data in history area 26[i-1] is returned.

Data subjected to save stopping can be used by the following method.

History data Sv included in each servo shaft is read out from history area 26[i]. Readout history data Sv is read out by host apparatus 45 via communication unit 13. Readout history data Sv can be used for adjustment of a servo gain.

Readout from host apparatus 45 to outside the servo system can be used by the following method.

Host apparatus 45 is connected to external apparatus 55 such as a personal computer.

For example, host apparatus 45 and external apparatus 55 can be connected via I/F unit 57 as an external serial communication means complying with a standard such as RS232C or USB. History data Sv read in external apparatus 55 can be used on external apparatus 55 by being graphically represented.

Alternatively, each servo amplifier 11 and external apparatus 55 can sometimes be connected to each other directly via a USB terminal provided for servo amplifier 11 by using a USB cable or the like. In this case, history data Sv is directly read out from external apparatus 55 via the USB cable.

As described above, the arrangement of this exemplary embodiment allows even a servo system in which host apparatus 45 has no means for issuing an instruction to stop saving history data Sv to acquire history data Sv whose time axes coincide with each other. Accordingly, the servo system according to the exemplary embodiment can analyze in detail mutual influences of a plurality of servo shafts controlled by the respective servo amplifiers.

Figure 7:
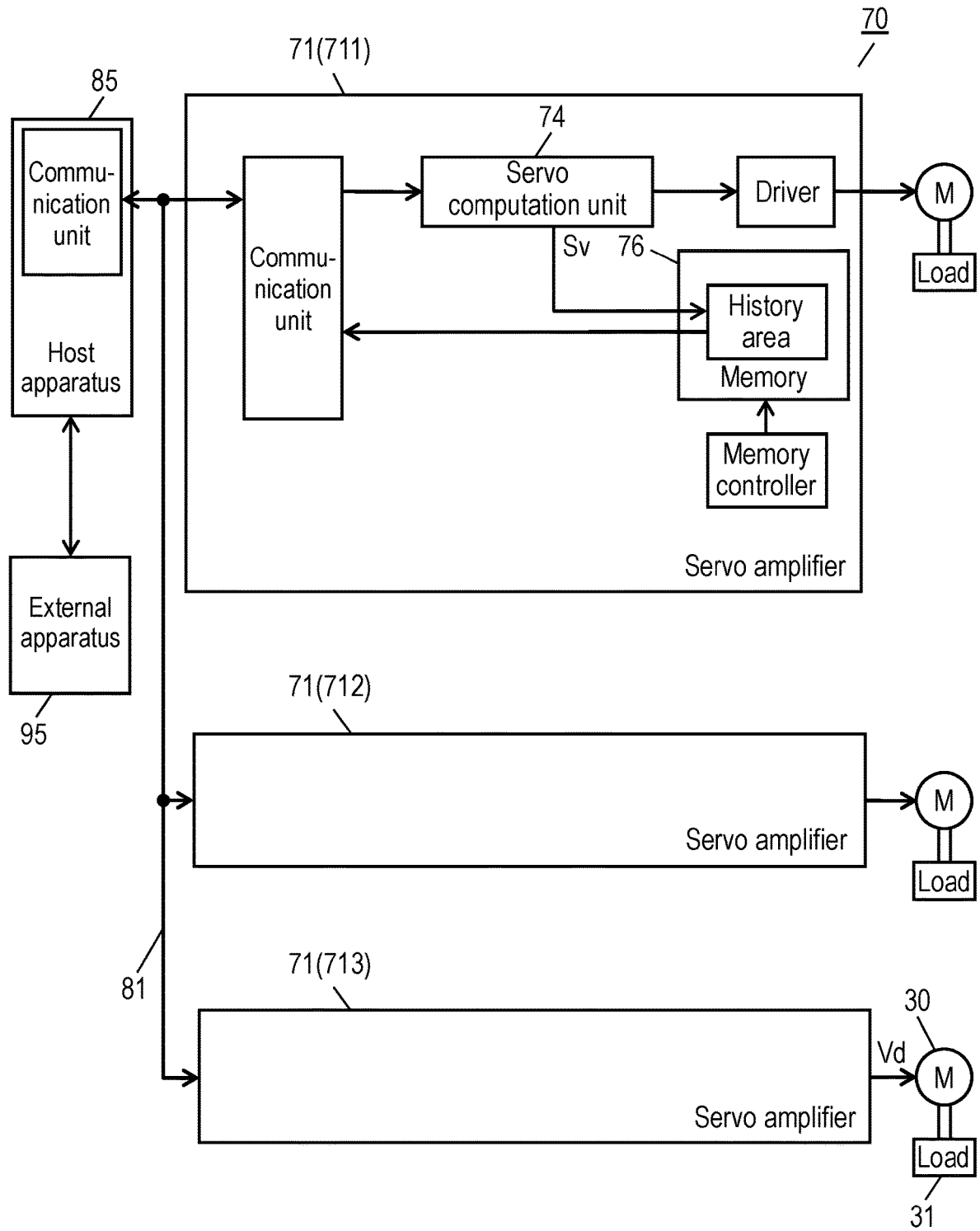
FIG. 7 is a block diagram showing an arrangement of a conventional servo system.
Figure 8:
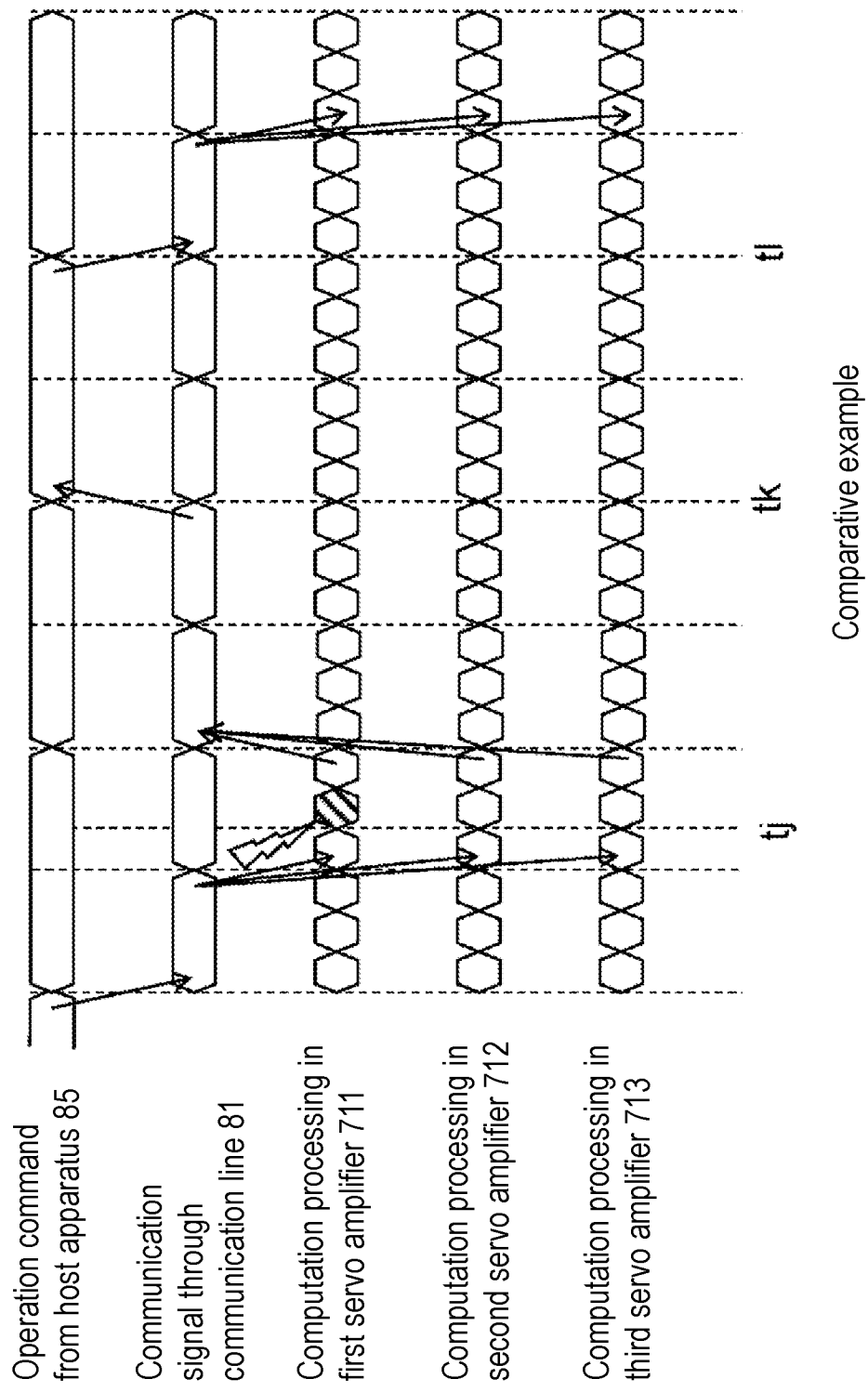
FIG. 8 is a timing chart showing timings in the servo system having the conventional arrangement in FIG. 7 as a comparative example.

FIG. 8 is a timing chart showing timings in a conventional arrangement as a comparative example in FIG. 7. Differences between the conventional arrangement and the arrangement of this exemplary embodiment will be described below with reference to FIG. 8.

In the comparative example in FIG. 8, upon detecting a trigger at time tj, servo amplifier 71 notifies host apparatus 85 of a trigger detection flag at time tk. In this case, host apparatus 85 instructs all servo amplifiers 71 to stop saving history data Sv in a servo computation period at time tl. In this case, an instruction to stop saving history data Sv is transmitted to servo amplifier 71 upon detection of a trigger with a delay corresponding to a time of 14 servo computation periods.

In contrast to this, the arrangement according to this exemplary embodiment can issue an instruction to stop with a delay corresponding to a time of five servo computation periods since a servo computation period in which a trigger is detected, thus greatly speeding up a save stop timing of servo computation information as compared with the comparative example.

The trigger condition at time tf in FIG. 6 is replaced with a condition for detecting occurrence of an abnormality in the servo system, which can be detected by each servo amplifier, by applying the arrangement according to this exemplary embodiment, thereby changing the operation at time th from stopping saving history data to processing of stopping the motor. This change makes it possible to synchronize stop timings of motor operations of a plurality of servo shafts at the time of occurrence of an abnormality.

Consider a mechanism required to perform simultaneous operations of a plurality of servo shafts, such as a mechanism of a gantry arrangement. In this case, differences between stop timings of motors may cause twisting of a mechanism and damage to an apparatus. However, applying an application example of this exemplary embodiment can also obtain an effect of reducing twisting of a mechanism and damage to an apparatus.

INDUSTRIAL APPLICABILITY

The servo system and the control method for the servo system according to the present invention are effective for a semiconductor manufacturing apparatus, electronic component mounting apparatus, and the like which are configured to synchronously control a plurality of servo shafts by synchronous serial communication.

The invention claimed is:

1. A servo system comprising: a host apparatus; and a plurality of servo amplifiers, the host apparatus and the plurality of servo amplifiers transmitting and receiving a communication signal,
   each of the servo amplifiers including
   a servo computation unit configured to perform servo computation processing for each servo computation period,
   a communication unit configured to transmit and receive the communication signal,
   a storage unit configured to save servo computation information in the servo computation processing as history data, and
   a trigger processor configured to set, in advance, a save stop condition for stopping saving the history data, determine, for each servo computation period, whether the save stop condition is matched, and notify, when the save stop condition is matched, the communication unit of a determination result indicating detection of a trigger as a trigger detection flag.

2. The servo system according to claim 1, wherein the trigger processor determines the trigger detection flag in each of all other servo amplifiers other than a servo amplifier of a self shaft, computes a hold count indicating a count of servo computation periods until a servo computation period in which the storage unit is instructed to stop saving the history data since the servo computation period in which the trigger is detected, when the trigger detection flag in each of all the other servo amplifiers indicates that the save stop condition is not matched, and instructs the storage unit to stop saving the history data in a servo computation period after the hold count.

3. The servo system according to claim 1, wherein
   the host apparatus updates an operation command for each operation command update period,
   the host apparatus and the plurality of servo amplifiers transmit and receive the communication signal in a communication period 1/L times, where L is an integer, the operation command update period of the host apparatus, and
   the servo computation period of the servo computation unit is synchronized with a period 1/M times, where M is an integer, the communication period.

4. The servo system according to claim 2, wherein priorities are assigned to instructions to stop saving the history data in the storage unit so as to assign a higher priority to an instruction to stop saving based on reception of the trigger detection flag from each of the other servo amplifiers than an instruction to stop saving in a servo computation period after the hold count.

5. The servo system according to claim 1, wherein a servo amplifier that has detected the trigger stops a motor instead of stopping saving the history data.

6. The servo system according to claim 5, wherein the servo amplifier other than a servo amplifier that has detected the trigger stops the motor instead of stopping saving the history data upon reception of the trigger detection flag from each of the other servo amplifiers.

7. A control method for a servo system in which a host apparatus and a plurality of servo amplifiers transmit and receive a communication signal, the control method comprising:
   setting, in advance, a save stop condition for stopping saving history data in a storage unit configured to store servo computation information in servo computation processing as the history data;

determining, for each servo computation period, whether the save stop condition is matched; and setting, as a trigger detection flag, a determination result indicating that a trigger is detected when the save stop condition is matched.

8. The control method for the servo system according to claim 7, further comprising:

determining the trigger detection flag in each of all other servo amplifiers; and computing a hold count indicating a count of servo computation periods until a servo computation period in which the storage unit is instructed to stop saving the history data since the servo computation period in which the trigger is detected, when the trigger detection flag in each of all the other servo amplifiers indicates that the save stop condition is not matched, and instructing the storage unit to stop saving the history data in a servo computation period after the hold count.

9. The control method for the servo system according to claim 8, wherein priorities are assigned to instructions to stop saving the history data in the storage unit so as to assign a higher priority to an instruction to stop saving based on reception of the trigger detection flag from each of the other servo amplifiers than an instruction to stop saving in a servo computation period after the hold count.

10. The control method for the servo system according to claim 8, comprising stopping a motor instead of instructing to stop saving the history data.

11. The control method for the servo system according to claim 10, wherein the instructing to stop saving the history data is replaced with stopping the motor instead of stopping saving the history data upon reception of the trigger detection flag from each of other servo amplifiers.

* * * * *